(12) United States Patent
Chen et al.

(10) Patent No.: US 12,305,557 B2
(45) Date of Patent: May 20, 2025

(54) COMPRESSED NATURAL GAS COMBUSTION AND EXHAUST SYSTEM

(71) Applicant: JOHNSON MATTHEY PUBLIC LIMITED COMPANY, London (GB)

(72) Inventors: Hai-Ying Chen, Wayne, PA (US); Joseph Fedeyko, Wayne, PA (US); Jing Lu, Wayne, PA (US); Arthur Reining, Wayne, PA (US); Agnes Raj, Reading (GB)

(73) Assignee: Johnson Matthey Public Limited Company, London (GB)

( * ) Notice: Subject to any disclaimer, the term of this patent is extended or adjusted under 35 U.S.C. 154(b) by 146 days.

(21) Appl. No.: 18/067,890

(22) Filed: Dec. 19, 2022

(65) Prior Publication Data

US 2023/0193805 A1    Jun. 22, 2023

Related U.S. Application Data

(60) Provisional application No. 63/265,733, filed on Dec. 20, 2021.

(51) Int. Cl.
*F01N 3/28* (2006.01)
*F01N 3/20* (2006.01)

(52) U.S. Cl.
CPC ......... *F01N 3/2803* (2013.01); *F01N 3/2006* (2013.01); *F01N 3/206* (2013.01); *F01N 2370/04* (2013.01); *F01N 2510/063* (2013.01)

(58) Field of Classification Search
CPC ...... F01N 3/2803; F01N 3/2006; F01N 3/206; F01N 2370/04; F01N 2510/063;
(Continued)

(56) References Cited

U.S. PATENT DOCUMENTS 5,260,043 A    1/1993 Li et al.
6,395,675 B1 *    5/2002 Suga ................... B01J 23/8946
502/328

(Continued)

FOREIGN PATENT DOCUMENTS

CN    203978568 U    12/2014
CN    110192012 A    8/2019
(Continued)

*Primary Examiner* — Matthew T Largi
(74) *Attorney, Agent, or Firm* — BakerHostetler (57) ABSTRACT

The present invention relates to a compressed natural gas combustion and exhaust system comprising: (i) a natural gas combustion engine and (ii) an exhaust treatment system comprising an intake for receiving an exhaust gas from the combustion engine and a catalyst article arranged to receive and treat the exhaust gas, wherein the catalyst article comprises: a substrate having at least first and second coatings, the first coating comprising a palladium-containing alumina and/or a base-metal containing alumina and the second coating comprising a palladium-containing zeolite, wherein the first coating is arranged to contact the exhaust gas before the second coating; and, wherein the system is configured to selectively operate in: (a) a lean first mode in which sulphur is trapped on the first coating; and (b) a rich second mode whereby sulphur is released from the first coating. The present invention further relates to a method.

16 Claims, 4 Drawing Sheets

(58) Field of Classification Search
CPC ............... F01N 3/101; F01N 2560/027; F01N 2610/00; F01N 2900/1602; F01N 9/002; F01N 3/0885; F01N 2510/0684; F01N 3/085; F01N 2510/068; F01N 2570/04; B01D 53/9468; B01D 53/9472
See application file for complete search history.

(56) References Cited

U.S. PATENT DOCUMENTS

| | | |
|---|---|---|
| 8,745,974 B2 | 6/2014 | Zemskova |
| 2005/0145827 A1* | 7/2005 | McCabe .............. B01J 20/0237 252/189 |
| 2007/0065341 A1* | 3/2007 | Asanuma .............. F02D 41/028 422/62 |
| 2011/0030346 A1* | 2/2011 | Neubauer .............. B01J 29/126 60/297 |
| 2013/0149220 A1* | 6/2013 | Swallow .................. B01J 23/40 502/74 |
| 2015/0202572 A1 | 7/2015 | Chiffey et al. |
| 2016/0045867 A1* | 2/2016 | Kearl ....................... B01J 20/02 502/65 |
| 2016/0236147 A1* | 8/2016 | Chen ..................... F01N 3/0222 |
| 2017/0306823 A1* | 10/2017 | Onoe ..................... B01J 23/464 |
| 2018/0238216 A1* | 8/2018 | Han ................... B01D 53/9454 |

FOREIGN PATENT DOCUMENTS

| | | | |
|---|---|---|---|
| GB | 2 492 175 | A | 12/2012 |
| TW | 211527 | B | 8/1993 |
| WO | 2019/229675 | A1 | 12/2019 |
| WO | 2020260669 | A1 | 12/2020 |
| WO | 2021074605 | A1 | 4/2021 |

* cited by examiner

COMPRESSED NATURAL GAS COMBUSTION AND EXHAUST SYSTEM

The present invention relates to a compressed natural gas combustion and exhaust system and, in particular, to one which has improved sulphur tolerance.

Natural gas is of increasing interest as an alternative fuel for vehicles and stationary engines that traditionally use gasoline and diesel fuels. Natural gas is composed mainly of methane (typically 70-90%) with variable proportions of other hydrocarbons such as ethane, propane and butane (up to 20% in some deposits) and other gases. It can be commercially produced from oil or natural gas fields and is widely used as a combustion energy source for power generation, industrial cogeneration and domestic heating. It can also be used as a vehicle fuel.

Natural gas can be used as transportation fuel in the form of compressed natural gas (CNG) and liquefied natural gas (LNG). CNG is carried in tanks pressurised to 3600 psi (~248 bar) and has an energy density around 35% of gasoline per unit volume. LNG has an energy density 2.5 times that of CNG and is mostly used for heavy-duty vehicles. It is cooled to liquid form at −162° C. and as a result the volume is reduced 600 fold meaning LNG is easier to transport than CNG. Bio-LNG could be an alternative to natural (fossil) gas, being produced from biogas, derived by anaerobic digestion from organic matter such as landfill waste or manure.

Natural gas has a number of environmental benefits: it is a cleaner burning fuel typically containing few impurities, it contains higher energy (Bti) per carbon than traditional hydrocarbon fuels resulting in low carbon dioxide emissions (25% less greenhouse gas emissions), and it has lower emissions of PM and NOx compared to diesel and gasoline. Biogas could reduce such emissions further.

Further drivers for the adoption of natural gas include high abundance and lower cost compared to other fossil fuels.

Natural gas engines emit very low PM and NOx (up to 95% and 70% less, respectively) compared to heavy-duty and light-duty diesel engines. However, exhaust gas produced by NG engines often contains significant quantities of methane (so-called "methane slip"). The regulations which cap emissions from these engines currently include Euro VI and the US Environmental Protection Agency (EPA) greenhouse gas legislation. These impose emissions limits for methane, nitrogen oxides (NOx) and particulate matter (PM).

The two main operating modes used for methane fueled engines are stoichiometric conditions ($\lambda=1$) and lean burn conditions ($\lambda \geq 1.3$). Palladium-based catalysts are well known as the most active type of catalyst for methane oxidation under both conditions. The regulated emissions limits for both stoichiometric and lean burn compressed natural gas engines can be met by the application of either palladium-rhodium three-way catalyst (TWC) or platinum-palladium oxidation catalyst respectively.

The growth of this Pd based catalyst technology depends on overcoming challenges in terms of cost and catalyst deactivation due to sulphur, water and thermal ageing.

Methane is the least reactive hydrocarbon and high energy is required to break the primary C—H bond. The ignition temperature of alkanes generally decreases with increasing fuel to air ratio and increasing hydrocarbon chain length which correlates with the C—H bond strength. It is known that with Pd-based catalysts, the light-off temperature for methane conversion is higher than for other hydrocarbons (where "light-off temperature" means the temperature at which conversion reaches 50%).

When operating in stoichiometric conditions ($\lambda=1$), a TWC is used as an effective and cost efficient after-treatment system to combust methane. Mostly bimetallic Pd—Rh catalysts with high total platinum group metal (pgm) loadings of >200 gft$^{-3}$ are needed for high levels of methane conversion to meet end of life total hydrocarbon (THC) regulations due to the very low reactivity of this hydrocarbon and catalyst deactivation via thermal and chemical effects. Use of high pgm loadings will improve the overall HC conversion in stoichiometric CNG engines. However, high methane conversions can be achieved with relatively low pgm based on engine calibration, i.e. controlling air to fuel ratio so as to operate near stoichiometric or rich of stoichiometric; the pgm loading can also be varied corresponding to the regional legislation requirement with regards to methane and non-methane conversions.

The reduction of NOx and oxidation of methane is also more difficult under very oxidising conditions. For lean burn CNG applications, Pd—Pt at high total pgm loadings (>200 gft$^{-3}$) are needed for methane combustion at lower temperatures. Unlike with stoichiometric engines, a reductant also needs to be injected into the exhaust stream in order to be able to reduce NOx in the presence of excess oxygen. This is normally in the form of ammonia ($NH_3$), and thus lean burn applications require a completely different catalyst system to those that are stoichiometric, where efficient NOx reduction can be achieved with the use of CO or HC at slightly rich or stoichiometric conditions.

Due to the unreactive (or poorly reactive) nature of methane at lower temperatures, increased methane emissions may result during cold start and idle situations. In order to improve the reactivity of methane at lower temperatures, one of the options is to use high pgm loadings, which increases costs.

Natural gas catalysts, especially Pd-based catalysts, may suffer from poisoning by water (5-12%) and sulphur (<0.5 ppm $SO_2$ in lube oil) especially under lean conditions, which results in drastic reduction of conversion rate of the catalyst over time. The deactivation due to water is significant due to the formation of hydroxyl, carbonates, formates and other intermediates on the catalyst surface. The activity is reversible and can be recovered completely if water is removed. However, this is impractical as methane combustion feed always contains a high level of water due to the high content of H in methane.

$H_2O$ can be either an inhibitor or a promoter depending on the air-to-fuel ratio, i.e. lambda. Under stoichiometric and reducing conditions, lambda >1, $H_2O$ can act as a promoter for the oxidation of hydrocarbons through the steam reforming reaction in both CNG and gasoline engines. However for lean burn CNG operating at lambdas >1, $H_2O$ acts as an inhibitor for methane oxidation. It is critical to understand the water inhibition effect and design catalysts which are more tolerant to the presence of $H_2O$. This would allow for improvement when trying to control methane emissions from lean burn CNG.

Though the sulphur level is very low in the engine exhaust, Pd-based catalysts deactivate significantly upon sulphur exposure due to the formation of stable sulphates. Regeneration of the catalyst in order to restore the activity following sulphur poisoning is challenging and will usually require high temperatures, rich operation or both. This is easily achievable in stoichiometric operation but more difficult in lean burn. A lean burn vehicle operates with a much higher air-to-fuel ratio than a stoichiometric vehicle and will need injection of a much higher concentration of reductant to switch to rich operation. Thermal deactivation resulting from a high level of misfire events due to poor engine transient control and ignition systems destroys the catalyst and correspondingly leads to a high level of exhaust emissions.

The palladium-containing catalyst deactivates under both lean and stoichiometric conditions, but sulphur poisoning has a more dramatic impact than thermal ageing in lean operation. Sulphur poisoning can be improved by the addition of small amounts of Pt to the Pd catalyst. This is because the sulphur inhibition due to formation of palladium sulphates can be reduced significantly on addition of Pt. However, the addition of Pt further increases the costs.

Accordingly, there is a desire for the provision of an improved system for natural gas combustion and exhaust gas treatment to reduce methane emissions by tackling catalyst deactivation, such as by sulphur, water and thermal ageing, without increasing the cost of the catalyst. It is an object of the present invention to address this problem, tackle the disadvantages associated with the prior art, or at least provide a commercially useful alternative thereto.

According to a first aspect there is provided a compressed natural gas combustion and exhaust system comprising:
(i) a natural gas combustion engine and
(ii) an exhaust treatment system comprising an intake for receiving an exhaust gas from the combustion engine and a catalyst article arranged to receive and treat the exhaust gas, wherein the catalyst article comprises:
a substrate having at least first and second coatings, the first coating comprising a palladium-containing alumina and/or a base-metal containing alumina and the second coating comprising a palladium-containing zeolite,
wherein the first coating is arranged to contact the exhaust gas before the second coating; and, wherein the system is configured to selectively operate in:
(a) a lean first mode in which sulphur is trapped on the first coating; and
(b) a rich second mode whereby sulphur is released from the first coating.

In the following passages different aspects/embodiments are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present invention relates to a compressed natural gas combustion and exhaust system.

A natural gas combustion engine is an engine used for combusting natural gas. The natural gas combustion engine may be a mobile engine, which means that it is generally suitable for use in an automobile or other vehicle (e.g. off-road vehicles)-in such systems there may be changes during operation in the fuel supply and demand, depending on operator requirements, such as acceleration. In mobile applications, natural gas combustion may be configured to run in a lean or stoichiometric configuration. In a mobile application it is generally possible to temporarily run the system in a rich mode. Although the engine is described as being "mobile", it should be appreciated that it can be used across a range of different applications.

An exhaust treatment system is a system suitable for treating an exhaust gas from the combustion engine. The exhaust treatment system comprises an intake for receiving an exhaust gas from the combustion engine and a catalyst article arranged to receive and treat the exhaust gas. The intake may be a conduit or pipe configured to direct exhaust from the combustion engine to the catalyst article.

A catalyst article is a component suitable for use in an exhaust gas system. Typically such articles are honeycomb monoliths, which may also be referred to as "bricks". These have a high surface area configuration suitable for contacting the gas to be treated with a catalyst material to effect a transformation or conversion of components of the exhaust gas. Other forms of catalyst article are known and include plate configurations, as well as wrapped metal catalyst substrates. The catalyst article described herein is suitable for use in all of these known forms, but is especially preferred that it takes the form of a honeycomb monolith as these provide a good balance of cost and manufacturing simplicity.

The catalyst article is for the treatment of an exhaust from a natural gas combustion engine. That is, the catalyst article is for the catalytic treatment of exhaust gases from a natural-gas combustion engine in order to convert or transform components of the gases before they are emitted to the atmosphere in order to meet emissions regulations. When natural gas is combusted it will produce both carbon dioxide and water, but the exhaust gas also contains an amount of additional methane (and other short chain hydrocarbons) that needs to be catalytically removed before the exhaust is emitted to the atmosphere. The exhaust gases also typically contain significant amounts of water and sulphur that can build up and deactivate the catalyst.

The catalyst article comprises a substrate having at least first and second coatings. Preferably the first coating is provided as a washcoat on the substrate and/or the second coating is provided as a washcoat on the substrate. Preferably both coatings are provided as washcoats on the substrate. Preferably the substrate is a flow-through monolith.

The first coating comprises a palladium-containing alumina and/or a base-metal containing alumina. The first coating is effective for absorbing or trapping sulphur present in exhaust gas received from a CNG engine in lean conditions ($\lambda>1$) and can be regenerated (i.e. sulphur released therefrom) over a short time period in rich conditions ($\lambda<1$).

Figure 2:
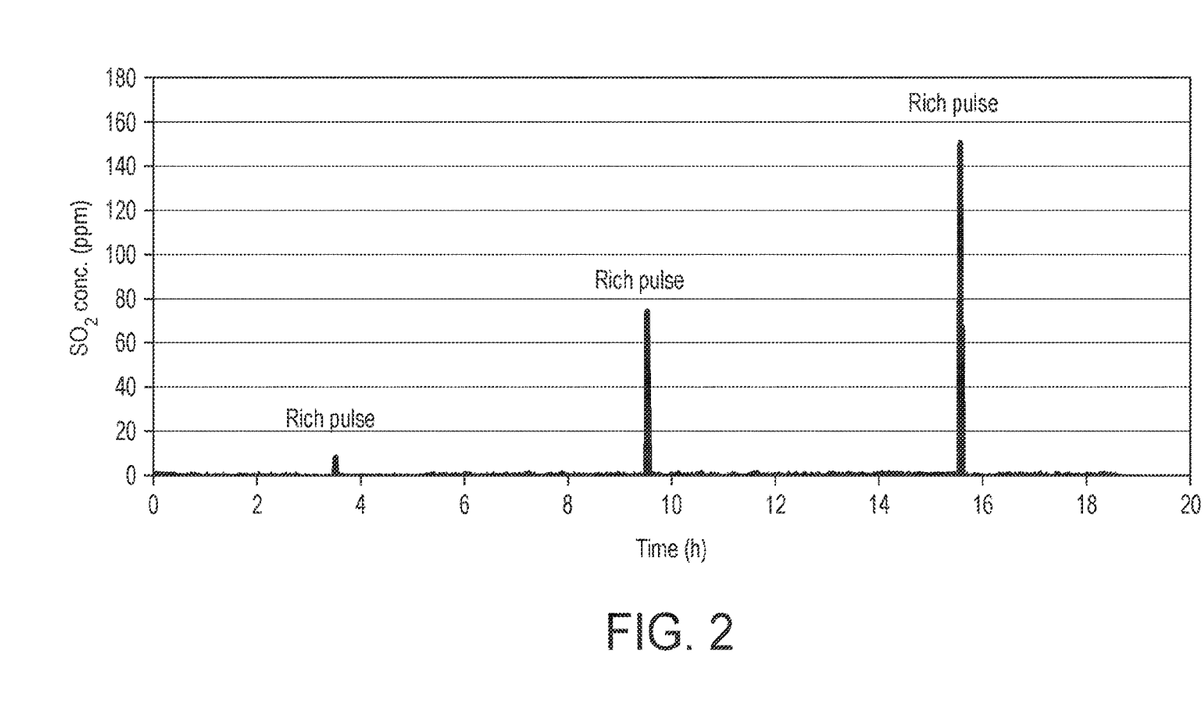
FIG. 2 is a graph demonstrating release of stored sulphur from the catalyst of Example 2, which is palladium supported on alumina, on reduction of oxygen concentration and injection of polypropylene into the synthetic gas mixture flowed through the catalyst.

Advantageously, the release of sulphur from the first coating, and so regeneration of the first coating, can be chemically-induced by reducing the oxygen concentration of the exhaust gas received by the catalyst article and optionally by also injecting hydrocarbons into the exhaust gas received by the catalyst article as discussed in respect of the data shown in FIG. 2 of the present application. In other words, the rich conditions of the rich second mode may be achieved by reducing the oxygen concentration of the exhaust gas received by the catalyst article and optionally by also injecting fuel or hydrocarbons into the exhaust gas received by the catalyst article.

The alumina may be any type of alumina, such as alpha or gamma alumina. Furthermore, the alumina may be doped as is known in the art. For example doping with Si or La in amounts of up to 15 wt %, such as 1 to 10 wt % and preferably about 5 wt %, can provide improvements in thermal stability. Preferably the alumina in the first coating is gamma alumina. Preferably the first coating has a washcoat loading of 1 to 50 g/ft$^3$, more preferably 5 to 40 g/ft$^3$ and most preferably 10 to 30 g/ft$^3$.

The second coating comprises a palladium-containing zeolite. Such a palladium-containing zeolite demonstrates excellent activity for treatment of exhaust gas from a CNG engine despite the presence of water within the exhaust gas, but is prone to sulphur inhibition. Such a palladium-containing catalyst has high stability when exposed to rich conditions during the rich second mode and can tolerate periodic exposure to high concentrations of sulphur, such as during the rich second mode. As shown by the data in FIG. 1 of this application and discussed later in this specification, the presence of $SO_2$ in the exhaust gas during the rich second mode does reduce the activity of the palladium-containing zeolite temporarily. However, as the palladium-containing zeolite does not significantly store $SO_2$ when exposed to $SO_2$ for the short period during which the system operates in the second rich mode, the activity of the palladium-containing zeolite is substantially restored when the lean first mode resumes. In other words, the palladium-containing zeolite is not destabilised by the sulphur released from the first coating during intermittent operation of the system in the rich second mode. This is in contrast to other palladium containing catalysts, such as palladium supported on alumina, as shown by the data in FIG. 1 discussed in further detail below.

Preferably the zeolite has a SAR of ≥1200, preferably ≥1300, such as ≥1500 (e.g. ≥1700), more preferably ≥2000, such as ≥2200. Preferably the second coating has a washcoat loading of 1 to 50 g/ft³, more preferably 5 to 40 g/ft³ and most preferably 10 to 30 g/ft³.

The first coating is arranged to contact the exhaust gas before the second coating. This arrangement enables the first coating to trap sulphur within the exhaust gas such that the exhaust gas received by the second coating during the first lean mode has a reduced sulphur content. Consequently, deactivation of the palladium-containing zeolite of the second coating by sulphur during the first lean mode is reduced.

Preferably the first coating is upstream of the second coating in a zoned configuration. This permits the first coating to contact the exhaust gas before the second coating.

Preferably the substrate has an inlet end and an outlet end, optionally wherein the first coating extends from the inlet end and the second coating extends from the outlet end. This permits the first coating to contact the exhaust gas before the second coating.

Preferably the first coating extends from 20 to 80%, preferably 60 to 80% of an axial length of the substrate and/or wherein the second coating extends from 20 to 80%, preferably 20 to 40% of an axial length of the substrate, and/or wherein the first coating and the second coating together substantially cover the substrate.

Preferably the first coating and the second zone overlap by at least 10% of an axial length of the substrate. Preferably the first coating and the second zone overlap by up to 25% of an axial length of the substrate.

Alternatively, the first coating may be arranged on the second coating in a layered configuration. This permits the first coating to contact the exhaust gas before the second coating.

The system is configured to selectively operate in: (a) a lean first mode in which sulphur is trapped on the first coating; and (b) a rich second mode whereby sulphur is released from the first coating. During the lean first mode, the system operates with lean burn conditions i.e. (λ>1) and during the rich second mode, the system operates with rich burn conditions (i.e. λ<1).

During the lean first mode, the first coating traps sulphur present in the exhaust gas such that the exhaust gas received by the second coating has a reduced sulphur content. This reduces deactivation/poisoning of the palladium-containing zeolite catalyst present in the second coating thereby maintaining its high oxidation performance during operation of the system in the lean first mode. To regenerate the catalyst, particularly the first coating of the catalyst, the system periodically/intermittently operates in a rich second mode whereby sulphur is released from the first coating.

During the rich second mode, the concentration of oxygen in the exhaust gas received by the catalyst article may be decreased, for example, by injecting an inert gas, such as argon. The system may comprise an injector upstream of the catalytic article configured to inject an inert gas, such as argon, into the exhaust gas during operation of the system in the rich second mode.

During the rich second mode, the concentration of hydrocarbons in the exhaust gas received by the catalyst article may be increased by injection of one or more hydrocarbons into the exhaust gas. For example, the system may comprises an injector upstream of the catalytic article configured to inject one or more hydrocarbons, such as propylene, into the exhaust gas during operation of the system in the rich second mode.

By reducing the concentration of oxygen in the exhaust gas and optionally also increasing the hydrocarbon content, rich conditions that cause sulphur to be released from the first coating thereby regenerating the first coating may be achieved. In other words, operation of the system in the rich second mode may be achieved by reducing the concentration of oxygen in the exhaust gas received by the catalyst article and optionally also injection of one or more hydrocarbons. Advantageously, such chemically-induced sulphur release does not require the temperature of the exhaust gas to be increased. In other words, the temperature of the exhaust gas may be kept substantially the same during the lean first mode and the rich second mode. In contrast, typical techniques for regeneration of known sulphur trap arrangements involve thermal release of the stored sulphur, which requires a substantial temperature increase (i.e. several hundred degrees Celsius higher) from its operating temperature. This can be extremely challenging to apply due to the increased engine control required, the potential for thermal deactivation of the catalyst article and the potential thermal degradation of components of the engine, such as the turbocharger.

As discussed above, the temperature of the exhaust gas may remain substantially the same during the lean first mode and the rich second mode. For example, the temperature of the exhaust gas during the lean first mode may be within 20° C., preferably within 10° C., more preferably within 5° C. of the temperature of the exhaust gas during the second rich mode.

The temperature of the exhaust gas during the lean first mode and the rich second mode may be less than 750° C., preferably less than 650° C., most preferably between 500 and 600° C.

In an alternative, but less preferred arrangement, during the rich second mode the temperature of the exhaust gas may increase. During the first lean mode the temperature of the exhaust gas may be less than 750° C. Preferably, during the rich second mode the temperature of the exhaust gas does not exceed 850° C.

Preferably, during one cycle, the system is configured to operate in the second rich mode for less than 5 minutes, preferably less than 3 minutes, more preferably less than or equal to one minute and to operate in the first lean mode for more than 10 minutes, preferably more than 30 minutes, preferably more than or equal to 60 minutes. In other words, the system may intermittently switch to operation in the second rich mode. By intermittently operating in the second rich mode, the first coating, which functions as a sulphur trap, can be regenerated without destabilising the performance of the palladium-containing zeolite of the second coating. In other words, the downstream second coating can withstand the rich conditions and high concentrations of sulphur experienced during the second rich mode for these short periods of time. As the system enables effective regeneration of the first coating over such a short period of time, the time between regeneration intervals (i.e. the time during which the system is operated in the lean first mode) can be increased.

Preferably, the system further comprises a sulphur trap downstream of the catalyst article for receiving sulphur released from the first coating during the rich second mode. The sulphur trap may trap the sulphur released from the first coating during the rich second mode thereby reducing sulphur emissions from the system.

Optionally, the system comprises a $SO_2$ sensor downstream of the second coating and a controller configured to switch the system to operate in the rich second mode on detection of exhaust stream $SO_2$ levels above a threshold value by the sensor. This is advantageous as by measuring $SO_2$ levels in the exhaust gas downstream of the second coating, the $SO_2$ sensor may monitor the $SO_2$ absorption by the first coating and determine if the first coating needs to be regenerated. For example, if the $SO_2$ levels in the exhaust gas are significantly increased, then this would demonstrate that the sulphur in the exhaust gas is not being sufficiently trapped/absorbed by the first coating and that consequently the first coating needs to be regenerated by operation of the system in the rich second mode. The $SO_2$ sensor may be positioned downstream of the catalyst article.

In accordance with a further aspect of the invention, there is provided a method for the treatment of an exhaust gas from a natural gas combustion engine, the method comprising:

contacting the exhaust gas with a catalyst article of an exhaust treatment system;
wherein the catalyst article comprises:
a substrate having at least first and second coatings, the first coating comprising a palladium-containing alumina and/or a base-metal containing alumina and the second coating comprising a palladium-containing zeolite,
wherein the first coating is arranged to contact the exhaust gas before the second coating;
the method further comprising operating the exhaust system in a lean first mode in which sulphur is trapped on the first coating; and intermittently operating the exhaust system in a rich second mode whereby sulphur is released from the first coating.

Preferably the method described in this aspect can be applied to the system described herein. Accordingly, all features described as preferably for the system apply equally to the method aspect.

FIGURES

The invention will be described further in relation to the following non-limiting Figures, in which:

The top graph of FIG. 1 shows the methane conversion performance of the catalysts of Example 1 and Example 2 under simulated steady state reactor conditions at 550° C. where pulses of 50 ppm of $SO_2$ having a duration of 1 minute were introduced each hour into the synthetic gas mixture flowed through the catalysts.

The middle graph of FIG. 1 shows the $SO_2$ slip from the catalyst of Example 2, which is a palladium-containing zeolite, under simulated steady state reactor conditions at 550° C. where pulses of 50 ppm of $SO_2$ having a duration of 1 minute were introduced each hour into the synthetic gas mixture flowed through the catalysts.

The bottom graph of FIG. 1 shows the $SO_2$ slip from the catalyst of Example 1, which is palladium supported on alumina, under simulated steady state reactor conditions at 550° C. where pulses of 50 ppm of $SO_2$ having a duration of 1 minute were introduced each hour into the synthetic gas mixture flowed through the catalysts.

FIG. 4 provides a schematic of an exemplary compressed natural gas combustion and exhaust system 1 according to the present disclosure that includes a combustion engine 2; an intake 4 for receiving an exhaust gas (not shown) from the engine 2; a catalyst article 6 arranged to receive and treat the exhaust gas that includes substrate 8, a first coating 10, and a second coating 12, wherein the first coating 10 is arranged to contact the exhaust gas before it contacts the second coating 12, and wherein—in this particular embodiment—the first coating 10 and the second coating 12 together substantially cover the substrate 8; an injector 14 located upstream of catalytic article 6 that is configured for injecting one or more hydrocarbons into the exhaust gas during operation of the system in a rich second mode of the system; a sulphur trap 16 that is downstream of the catalyst article 6 for receiving sulphur released from the first coating 10 during the rich second mode; an $SO_2$ sensor 18 downstream of the second coating 12; and, a controller 20 configured to switch the system to operate in the rich second mode of the system upon detection by the $SO_2$ sensor 18 of exhaust stream $SO_2$ levels above a threshold value.

EXAMPLES

The invention will now be described further in relation to the following non-limiting examples.

Example 1

The catalyst of Example 1 is a catalyst having a palladium-containing highly siliceous (SAR>1500) zeolite with a palladium content of 2-3 wt %.

The catalyst of Example 1 was prepared by impregnating a powder sample of siliceous zeolite (SAR>1500) with a solution of palladium nitrate by conventional incipient wetness technique. After impregnation, the sample was dried at 80° C. for 5 hours and calcined in air at 500° C. in a static oven for 2 hours.

A washcoat comprising the pre-formed Pd containing siliceous zeolite, an alumina binder and a silica binder was applied to a ceramic substrate, then the washcoat was pulled down the substrate using a vacuum. The article was dried and calcined at about 500° C. for about 1 hour. The loading of Pd on the article was 120 g/ft³.

Example 2

The catalyst of Example 2 is a catalyst having palladium supported on alumina having a palladium content of 3 wt %.

A washcoat comprising Palladium nitrate, gamma-alumina, alumina binder and citric acid was applied to a ceramic substrate, then the washcoat was pulled down the substrate using a vacuum. The article was dried and calcined at about 500° C. for about 1 hour. The loading of Pd on the article was 120 g/ft³.

The sulphur tolerance of the catalysts of Example 1 and Example 2 were tested by measuring their methane conversion under simulated steady state reactor conditions at 550° C. where pulses of 50 ppm of $SO_2$ having a duration of 1 minute were introduced each hour into the synthetic gas mixture flowed through the catalysts. The synthetic gas mixture had the following composition: 1000 ppm $CH_4$, 25 ppm $C_2H_6$, 5 ppm $C_3H_8$, 1000 ppm CO, 500 ppm NO, 12% $O_2$, 8% $H_2O$, 7.2% $CO_2$, balance $N_2$ with a space velocity of 100,000 $h^{-1}$. The data from the sulphur tolerance is shown in the top graph of FIG. 1.

This test simulates the increase in sulphur that would occur during periodic operation of the system of the present invention in the rich second mode due to release of sulphur from the first coating where the rich second mode is operated for 1 minute and the lean first mode is operated for 59 minutes each cycle.

The catalyst of Example 1 has a composition which is the same as the composition of the second coating of the present invention (palladium-containing zeolite). This test therefore compares the sulphur tolerance of the second coating of the present invention during periodic operation of the system in the rich second mode (for one minute per cycle) to Example 2, which instead comprises palladium supported on alumina.

Figure 1:
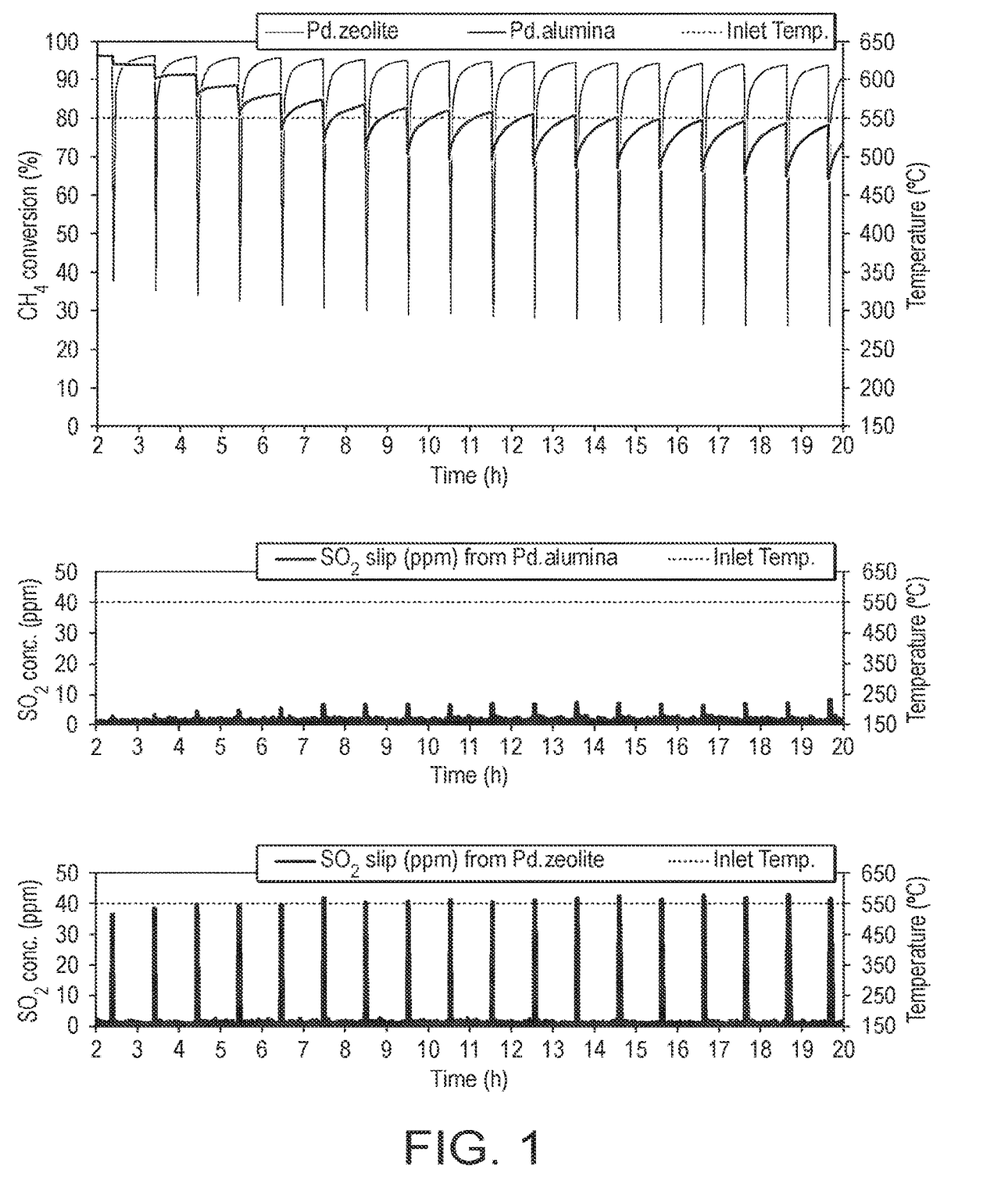

In FIG. 1, the methane conversion performance of the catalyst of Example 1, which is a palladium-containing zeolite, is demonstrated by a series of peaks that are all between 90 and 100%. The methane conversion performance of the catalyst of Example 2, which is palladium supported on alumina, is demonstrated by a series of peaks that continually decrease to less than 80%. As shown in FIG. 1, for the catalyst of Example 1, although a sharp decrease in performance occurred during each $SO_2$ pulse due to deactivation of the palladium-containing zeolite by sulphur in the exhaust gas, the drop in performance was rapidly recovered upon removal of sulphur from the gas stream, and the performance stabilized at greater than 95% methane conversion after multiple cycles. In contrast, for the catalyst of Example 2 (palladium supported on alumina), the performance of the catalyst continually decreased with each $SO_2$ pulse and did not stabilize after multiple cycles. The contrasting behaviour in performance recovery can be explained by monitoring the $SO_2$ slip from the catalysts of Example 1 and Example 2 during the sulphur tolerance test, which are shown in the middle and bottom graphs of FIG. 1. As shown in the middle graph of FIG. 1, palladium supported on alumina stored a significant amount of $SO_2$ during the $SO_2$ pulses. In contrast, as shown in the bottom graph of FIG. 1, $SO_2$ passes through the palladium-containing zeolite of Example 1 during the $SO_2$ pulses, as demonstrated by the greater $SO_2$ slip. As the palladium-containing zeolite of Example 1 does not significantly store sulphur during the $SO_2$ pulses, it is not deactivated by the sulphur over these short periods of high sulphur concentration.

FIG. 2 is a graph demonstrating the chemically-induced release of stored sulphur from the catalyst of Example 2 (palladium supported on alumina), which is the same composition as the first coating of the catalyst of the present invention. A synthetic gas mixture was flowed through the catalyst of Example 2 having a composition of 0.5 ppm $SO_2$ and 1000 ppm $CH_4$, 25 ppm $C_2H_6$, 5 ppm $C_3H_8$, 1000 ppm CO, 500 ppm NO, 12% $O_2$, 8% $H_2O$, 7.2% $CO_2$, balance $N_2$ at a space velocity of 100,000 $h^{-1}$ at a temperature of 550° C. The oxygen concentration of the gas mixture was reduced by injecting propylene into the gas mixture periodically for one minute per hour cycle. In other words, a lean gas mixture was provided to the catalyst for 59 minutes and a rich gas mixture was provided to the catalyst for one minute each cycle.

FIG. 2 demonstrates that palladium supported on alumina effectively absorbs sulphur during lean operation and releases sulphur during the periodic rich pulses. The concentration of sulphur released during each rich pulse increased with time (i.e. a greater amount of sulphur was released during the rich pulse at 15.5 hours than the rich pulse at 9.5 hours). It is expected that this is because longer exposure of palladium supported on alumina to the gas mixture resulted in greater sulphur absorbed thereon that could then be released during the rich pulse.

FIG. 2 demonstrates that the periodic rich pulses can be created by simultaneously reducing the oxygen concentration and increasing the hydrocarbon concentration of the gas received by the catalyst. In other words, FIG. 2 demonstrates that the release of $SO_2$ from palladium supported on alumina can be chemically-induced and so the temperature of the exhaust gas can be maintained at 550° C. during regeneration of palladium supported on alumina.

Accordingly, FIG. 2 demonstrates that palladium supported on alumina, which is the composition of the first coating of the present invention, can absorb sulphur during lean operation and can be regenerated without a substantial temperature increase but instead by chemical-inducement. In other words, the data of FIG. 2 demonstrates that reducing the oxygen concentration and increasing the hydrocarbon concentration of the exhaust gas received by the catalyst during operation of the system of the present invention in the rich second mode cause release of sulphur from the first coating without needing to increase the temperature of the exhaust gas. This is advantageous as thermal release of stored sulphur would normally require a substantial temperature increase (i.e. several hundred degrees Celsius higher) from its operating temperature, which can be extremely challenging to apply in terms of engine control, potential catalyst thermal deactivation and potential thermal degradation of components such as the turbocharger.

The effect of the rich pulses on the catalysts of Example 1 and Example 2 was tested by measuring their methane and ethane conversion under simulated steady state reactor conditions at 550° C. when flowing a synthetic gas mixture through the catalysts. The synthetic gas mixture comprised 1000 ppm $CH_4$, 25 ppm $C_2H_6$, 5 ppm $C_3H_8$, 1000 ppm CO, 500 ppm NO, 12% $O_2$, 8% $H_2O$, 7.2% $CO_2$, balance $N_2$ at a space velocity of 100,000 $h^{-1}$. Rich pulses where the concentration of oxygen within the synthetic mixture was decreased via injection of propylene took place for one minute at 4.5, 10.5 and 16.5 hours. The supply of NO gas to the synthetic gas mixture was switched off at 7.5 hours and switched back on at 14 hours so that NO was not present in the synthetic gas mixture between 7.5 and 14 hours. The data from this test is shown in FIG. 3.

Figure 3:
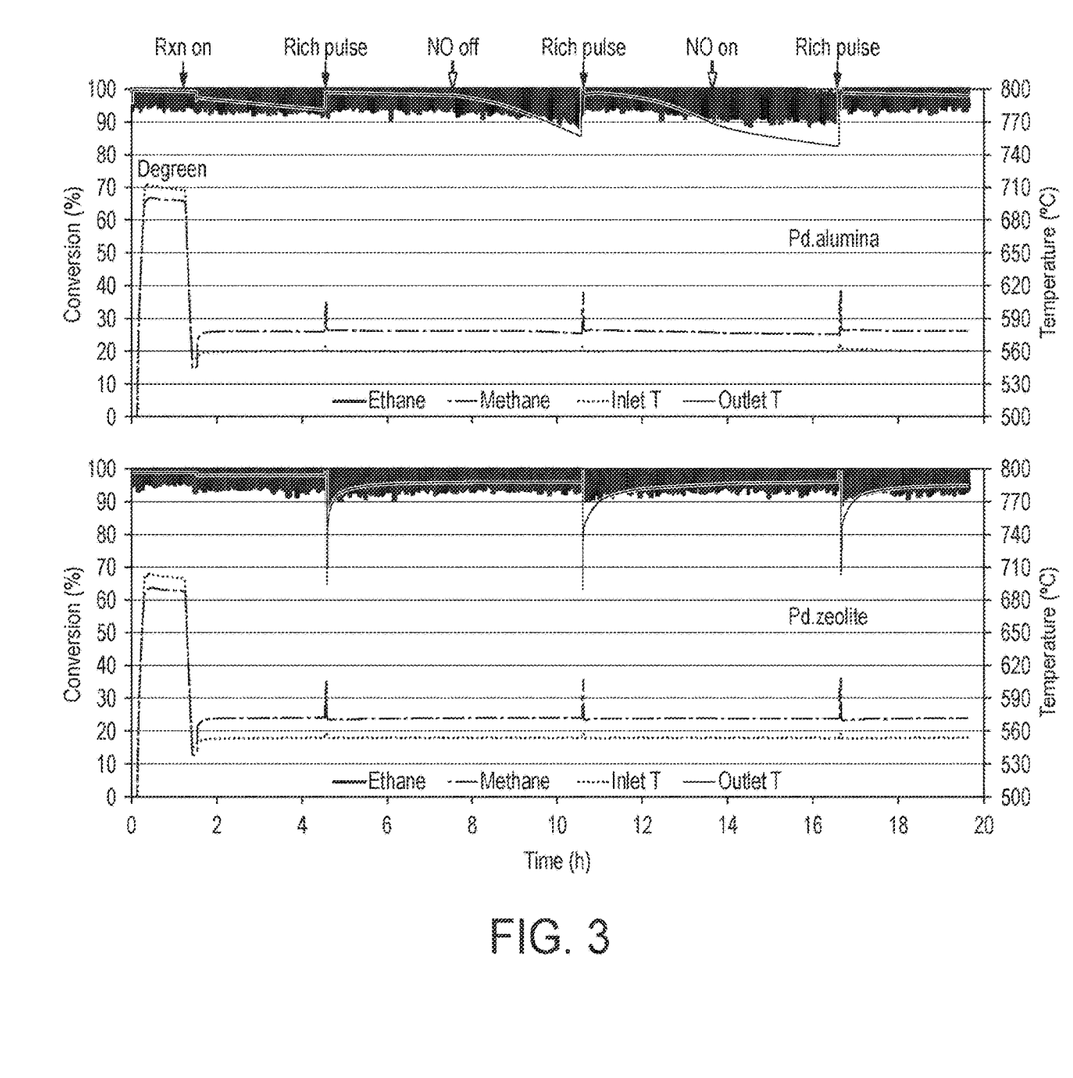
FIG. 3 shows the methane and ethane conversion performance of the catalysts of Examples 1 and 2 under simulated steady state reactor conditions at 550° C. where rich pulses having a duration of 1 minute took place for a duration of one minute at 4.5, 10.5 and 16.5 hours. The supply of NO gas to the synthetic gas mixture was switched off at 7.5 hours and switched back on at 14 hours so that NO was not present in the synthetic gas mixture between 7.5 and 14 hours. The top graph demonstrates methane and ethane conversion for the catalyst of Example 2, which is palladium supported on alumina, and the bottom graph demonstrates methane and ethane conversion for the catalyst of Example 1, which is a palladium-containing zeolite.
Figure 4:
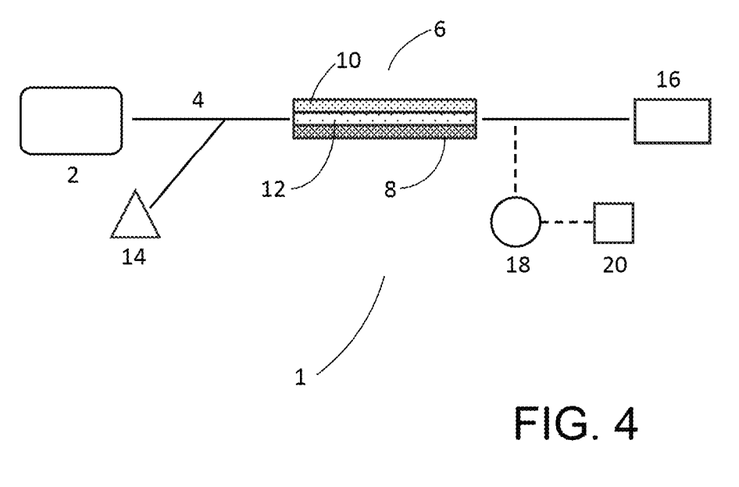

In FIG. 3, the ethane conversion for both Example 1 and Example 2 remains between 90 and 100%. The methane conversion for the catalyst of Example 1 (palladium-containing zeolite) starts at 100% and remains at between 90-100% during lean operation but shows sharp decreases of approximately 20-25% during each rich pulse. The methane conversion for the catalyst of Example 2 (palladium-containing zeolite) starts at 100% and shows a gradual decrease before and after each rich pulse. For both Example 1 and Example 2, the temperature of the exhaust gas at the inlet decreased from 700-710° C. after 2 hours and then remained at approximately 560° C. and the temperature of the exhaust gas at the outlet decreased from 650° C. after 2 hours at remained at approximately 570-580° C. with sharp increases to approximately 610° C. during the rich pulses.

As shown in FIG. 3, the conversion performed by the catalyst of Example 2, which is palladium supported on alumina, gradually decreases over time both before and after each rich pulse. It is expected that this is due to water induced deactivation of the catalyst. However, after a rich pulse and when NO is not present in the synthetic gas mixture, the rate of deactivation of the catalyst of Example 2 showed a sharp increase. This suggests that a significant change occurred to the palladium of the catalyst and that the methane oxidation activity is dependence on the presence of NO in the feed. It is expected that the change to the palladium of the catalyst of Example 2 was the reduction of PdO to metallic Pd and this assessment was supported by visual observation of the colour of the sample. In contrast, the graph of FIG. 3 demonstrates that the performance of the catalyst of Example 1, which is a palladium-containing zeolite, is extremely stable both before and after the rich pulses, and is not affected by the presence/removal of NO from the feed. Overall, those results suggest a much higher stability of a palladium-containing zeolite despite the rich pulses compared to palladium supported on alumina. It is noted that this higher stability is particularly advantageous when such a catalyst is employed as the second coating in the present invention as it can withstand the rich conditions when the system of the present invention is operated in the rich second mode to regenerate the first catalyst coating.

As used herein, the singular form of "a", "an" and "the" include plural references unless the context clearly dictates otherwise. The use of the term "comprising" is intended to be interpreted as including such features but not excluding other features and is also intended to include the option of the features necessarily being limited to those described. In other words, the term also includes the limitations of "consisting essentially of" (intended to mean that specific further components can be present provided they do not materially affect the essential characteristic of the described feature) and "consisting of" (intended to mean that no other feature may be included such that if the components were expressed as percentages by their proportions, these would add up to 100%, whilst accounting for any unavoidable impurities), unless the context clearly dictates otherwise.

It will be understood that, although the terms "first", "second", etc. may be used herein to describe various elements, layers and/or portions, the elements, layers and/or portions should not be limited by these terms. These terms are only used to distinguish one element, layer or portion from another, or a further, element, layer or portion. It will be understood that the term "on" is intended to mean "directly on" such that there are no intervening layers between one material being said to be "on" another material.

Spatially relative terms, such as "under", "below", "beneath", "lower", "over", "above", "upper" and the like, may be used herein for ease of description to describe one element or feature's relationship to another element(s) or feature(s). It will be understood that the spatially relative terms are intended to encompass different orientations of the device in use or operation in addition to the orientation depicted in the figures. For example, if a device as described herein is turned over, elements described as "under" or "below" other elements or features would then be oriented "over" or "above" the other elements or features. Thus, the example term "under" can encompass both an orientation of over and under. The device may be otherwise oriented and the spatially relative descriptors used herein interpreted accordingly.

The foregoing detailed description has been provided by way of explanation and illustration, and is not intended to limit the scope of the appended claims. Many variations of the presently preferred embodiments illustrated herein will be apparent to one of ordinary skill in the art, and remain within the scope of the appended claims and their equivalents.

The invention claimed is:

1. A compressed natural gas combustion and exhaust system comprising:
   (i) a natural gas combustion engine and
   (ii) an exhaust treatment system comprising an intake for receiving an exhaust gas from the combustion engine and a catalyst article arranged to receive and treat the exhaust gas, wherein the catalyst article comprises:
   a substrate having at least first and second coatings, the first coating comprising a palladium-containing alumina and/or a base-metal containing alumina and the second coating comprising a palladium-containing zeolite,
   wherein the first coating is arranged to contact the exhaust gas before the second coating; and, wherein the system is configured to selectively operate in:
   (a) a lean first mode in which sulphur is trapped on the first coating; and
   (b) a rich second mode whereby sulphur is released from the first coating;
   the system further comprising
   (iii) a sulphur trap downstream of the catalyst article for receiving sulphur released from the first coating during the rich second mode.

2. The system of claim 1, wherein during the rich second mode, the concentration of oxygen in the exhaust gas received by the catalyst article is decreased.

3. The system of claim 1, wherein the system further comprises an injector upstream of the catalytic article, wherein the injector is configured to inject one or more hydrocarbons into the exhaust gas during operation of the system in the rich second mode.

4. The system of claim 1, wherein the temperature of the exhaust gas remains substantially the same during the lean first mode and the rich second mode.

5. The system of claim 1, wherein during the rich second mode, the temperature of the exhaust gas increases, optionally wherein during the first lean mode the temperature of the exhaust gas is less than 750° C. and during the rich second mode the temperature of the exhaust gas is increased to greater than 800° C.

6. The system of claim 1, wherein the first coating is arranged upstream of the second coating in a zoned configuration.

7. The system of claim 6, wherein the substrate comprises an inlet end and an outlet end, optionally wherein the first coating extends from the inlet end of the substrate and the second coating extends from the outlet end of the substrate.

8. The system of claim 6, wherein the first coating extends from 20 to 80% of an axial length of the substrate and/or wherein the second coating extends from 20 to 80% of an axial length of the substrate, and/or wherein the first coating and the second coating together substantially cover the substrate.

9. The system of claim 6, wherein the first coating and the second coating overlap by at least 10% of an axial length of the substrate.

10. The system of claim 1, wherein the first coating is arranged on the second coating in a layered configuration.

11. The system of claim 1, wherein the first coating is provided as a washcoat on the substrate and has a washcoat loading of 1 to 50 g/ft$^3$ and/or wherein the second coating is provided as a washcoat on the substrate and has a washcoat loading of 1 to 50 g/ft$^3$.

12. The system of claim 1, further comprising a $SO_2$ sensor downstream of the second coating and a controller configured to switch the system to operate in the rich second mode on detection of exhaust stream $SO_2$ levels above a threshold value by the $SO_2$ sensor.

13. The system of claim 1, wherein the substrate is a flow-through substrate.

14. The system of claim 1, wherein the zeolite has a SAR of at least 1500 and/or wherein the alumina is gamma alumina.

15. The system of claim 1, wherein, during one cycle, the system is configured to operate in the second rich mode for less than 5 minutes and to operate in the first lean mode for more than 10 minutes.

16. A method for the treatment of an exhaust gas from a natural gas combustion engine, the method comprising:
 contacting the exhaust gas with a catalyst article of an exhaust treatment system;
 wherein the catalyst article comprises:
  a substrate having at least first and second coatings, the first coating comprising a palladium-containing alumina and/or a base-metal containing, alumina and the second coating comprising a palladium-containing zeolite
  wherein the first coating is arranged to contact the exhaust gas before the second coating;
 the method further comprising operating the exhaust system in a lean first mode in which sulphur is trapped on the first coating; and intermittently operating the exhaust system in a rich second mode whereby sulphur is released from the first coating, and released sulphur is received by a sulphur trap that is positioned downstream of the catalyst article.

* * * * *